US012795576B2

(12) United States Patent
Hu et al.

(10) Patent No.: US 12,795,576 B2
(45) Date of Patent: Nov. 10, 2026

(54) TIMER STARTING METHOD AND APPARATUS, AND TERMINAL AND STORAGE MEDIUM

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 534 days.

(21) Appl. No.: 18/338,426

(22) Filed: Jun. 21, 2023

(65) Prior Publication Data

US 2023/0337165 A1 Oct. 19, 2023

Related U.S. Application Data

(63) Continuation of application No. PCT/CN2021/071928, filed on Jan. 14, 2021.

(51) Int. Cl.
*H04W 72/232* (2023.01)
*H04W 56/00* (2009.01)
(Continued)

(52) U.S. Cl.
CPC ....... *H04W 56/009* (2013.01); *H04W 56/004* (2013.01); *H04W 72/1263* (2013.01); *H04W 72/232* (2023.01); *H04W 84/06* (2013.01)

(58) Field of Classification Search
CPC ............ H04W 72/21; H04W 56/0045; H04W 72/231; H04W 84/06; H04W 56/0065;
(Continued)

(56) References Cited

U.S. PATENT DOCUMENTS 11,799,612 B2 * 10/2023 Yang .................... H04L 1/1614
12,231,374 B2 * 2/2025 Stern-Berkowitz ....... H04L 5/14
(Continued)

FOREIGN PATENT DOCUMENTS

CN 106686691 5/2017
CN 111316735 6/2020
(Continued)

OTHER PUBLICATIONS

Thales, "FL Summary on enhancements on UL time and frequency synchronization for NR NTN," 3GPP TSG-RAN WG1 Meeting #103-e, R1-2009485, Oct. 2020.
(Continued)

*Primary Examiner* — Kwang B Yao
(74) *Attorney, Agent, or Firm* — Hodgson Russ LLP

(57) ABSTRACT

Disclosed are a timer starting method and a terminal. The method includes: determining a control parameter of a response time window timer based on a RTT between the terminal and a network side device; the control parameter including at least one of a start time offset of the timer and a timer duration; the start time offset of the timer being a time interval between an end time moment of uplink transmission corresponding to uplink small data and a start time moment of the response time window timer for the uplink transmission; and after the terminal performs the uplink transmission, starting the response time window timer corresponding to the uplink transmission based on the control parameter.

17 Claims, 5 Drawing Sheets

(51) Int. Cl.
*H04W 72/1263* (2023.01)
*H04W 84/06* (2009.01)

(58) Field of Classification Search
CPC ........... H04W 74/0833; H04W 56/009; H04W 56/004; H04W 72/1263; H04W 72/232; H04W 8/22; H04B 7/1855; H04B 7/1853; H04B 7/1851; H04B 7/18513; H04L 5/0091; H04L 5/0078; H04L 1/1812; Y02D 30/70
See application file for complete search history.

(56) References Cited

U.S. PATENT DOCUMENTS

| | | | | |
|---|---|---|---|---|
| 2022/0386263 | A1* | 12/2022 | Miao | H04L 5/0091 |
| 2023/0049008 | A1* | 2/2023 | Nishio | H04B 7/1853 |
| 2023/0254795 | A1* | 8/2023 | Ryu | H04W 72/21 370/350 |
| 2023/0397196 | A1* | 12/2023 | Nishio | H04L 5/0094 |
| 2023/0397247 | A1* | 12/2023 | Jung | H04B 7/18519 |

FOREIGN PATENT DOCUMENTS

| | | |
|---|---|---|
| CN | 111357338 | 6/2020 |
| CN | 111565448 | 8/2020 |
| CN | 111565472 | 8/2020 |
| CN | 111770565 | 10/2020 |
| CN | 111867126 | 10/2020 |
| KR | 20200040193 | 4/2020 |
| WO | 2018202045 | 11/2018 |
| WO | 2020071698 | 4/2020 |
| WO | 2022036640 | 2/2022 |
| WO | 2022151272 | 7/2022 |

OTHER PUBLICATIONS

CNIPA, Second Office Action for CN Application No. 202311333637.8, Mar. 19, 2025.

OPPO, "Consideration on MAC enhancement for NTN," 3GPP TSG-RAN WG2 Meeting #111 electronic, R2-2006781, Aug. 2020.

EPO, Communication for EP Application No. 21918480.1, Dec. 2, 2024.

EPO, Extended European Search Report for EP Application No. 21918480.1, Feb. 2, 2024.

Xiaomi, "IOT NTN user plane related issues," 3GPP TSG-RAN2 #113e, R2-2100180, Jan. 2021.

Nokia et al., "Timing Advance, Random Access and DRX aspects in NTN," 3GPP TSG-RAN WG2 Meeting #111 Electronic, R2-2007590, Aug. 2020.

Mediatek Inc., "New Study WID on NB-IoT/eTMC support for NTN," 3GPP TSG RAN Meeting #86, RP-193235 (revision of xx-yyxxxx), Dec. 2019.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)," 3GPP TS 36.300, Mar. 2023, v17.4.0.

WIPO, International Search Report and Written Opinion for PCT/CN2021/071928, Oct. 13, 2021.

Ericsson, "DL HARQ RTT Timer for SPS," 3GPP TSG-RAN WG2 AH 1807, Tdoc R2-1810189 (Update of R2-1808154), Jul. 2018.

CNIPA, Notice of Priority Examination of Patent Application for CN Application No. 202311333637.8, Sep. 20, 2024.

CNIPA, First Office Action for CN Application No. 202311333637.8, Oct. 11, 2024.

* cited by examiner

TIMER STARTING METHOD AND APPARATUS, AND TERMINAL AND STORAGE MEDIUM

CROSS-REFERENCE TO RELATED APPLICATION

This application is a continuation of International Application No. PCT/CN2021/071928, filed Jan. 14, 2021, the entire disclosure of which is incorporated herein by reference.

TECHNICAL FIELD

Embodiments of the present disclosure relate to the wireless communication technical field, and more specifically, to a timer starting method and device, a terminal and a storage medium.

BACKGROUND

Small data transmission is a technology which makes a terminal in a RRC_IDLE state (i.e., idle state) or a RRC_INACTIVE state (i.e., an inactive state) perform data transmission based on energy saving considerations.

In the small data transmission technology, in order to ensure the success rate of data transmission, it is proposed in related art that after a terminal sends data in the small data transmission procedure, it can start a response time window timer. During running of the response time window timer, the terminal monitors a response from the network side for the small data transmission, and determines whether to perform retransmission according to the monitoring situation.

SUMMARY

Embodiments of the present disclosure provide a timer starting method and device, a terminal and a storage medium. The technical solutions are as follows.

In a first aspect, an embodiment of the present disclosure provides a timer starting method. The method is performed by a terminal. The method includes:

- determining a control parameter of a response time window timer based on a Round Trip Time (RTT) between the terminal and a network side device, wherein the control parameter includes at least one of a start time offset of the timer and a timer duration;
- wherein the start time offset of the timer is a time interval between an end time moment of uplink transmission corresponding to uplink small data and a start time moment of the response time window timer for the uplink transmission; and
- after the terminal performs the uplink transmission, starting the response time window timer corresponding to the uplink transmission based on the control parameter:

In another aspect, an embodiment of the present disclosure provides an uplink advance obtaining method. The method is performed by a terminal. The method includes:

- before the terminal performs an uplink transmission corresponding to uplink small data, when the terminal has a positioning capability and a Timing Advance (TA) pre-compensation capability, obtaining a service link TA of the terminal based on the positioning capability and ephemeris information; and
- obtaining a TA of the terminal based on the service link TA.

In another aspect, an embodiment of the present disclosure provides a timer starting device, the device being applied to a terminal, and the device including:

- a parameter determination device configured to determine a control parameter of a response time window timer based on a Round Trip Time (RTT) between the terminal and a network side device, wherein the control parameter includes at least one of a start time offset of the timer and a timer duration;
- wherein the start time offset of the timer is a time interval between an end time moment of uplink transmission corresponding to uplink small data and a start time moment of the response time window timer for the uplink transmission; and
- a timer starting module configured to, after the terminal performs the uplink transmission, start the response time window timer corresponding to the uplink transmission based on the control parameter.

In another aspect, an embodiment of the present disclosure provides an uplink advance obtaining device, the method being performed by a terminal and the device including:

- a first uplink advance obtaining module configured to, before the terminal performs an uplink transmission corresponding to uplink small data, when the terminal has a positioning capability and a TA pre-compensation capability, obtain a service Timing Advance (TA) of the terminal based on the positioning capability and ephemeris information; and
- a second uplink advance obtaining module obtaining a TA of the terminal based on the service link TA.

In another aspect, an embodiment of the present disclosure provides a computer device, wherein the computer device includes a processor, a memory, and a transceiver. The memory stores a computer program. The computer program is executable by the processor to perform the above timer starting method or the uplink advance obtaining method.

In another aspect, an embodiment of the present disclosure provides a computer-readable storage medium, wherein a computer program is stored in the storage medium, and the computer program is loaded and executed by a processor to perform the above timer starting method or the uplink advance obtaining method.

In another aspect, there is provided a computer program product or computer program. The computer program product or computer program includes computer instructions, and the computer instructions are stored in a computer readable storage medium. A processor of a computer device reads the computer instructions from the computer readable storage medium, and the processor executes the computer instructions, causing the computer device to perform the above timer starting method or the uplink advance obtaining method.

The technical solutions provided by the embodiments of the present disclosure may bring the following beneficial effects:

For the response time window timer corresponding to uplink transmission corresponding to uplink small data, the terminal can determine the timer start offset and/or timer duration more accurately based on the RTT between the terminal and the network side device, so as to more accurately control the time for monitoring the response from the network side, thereby realizing accurate reception of the response and improving the uplink small data transmission effect. In addition, the present disclosure can prevent the terminal from unnecessarily monitoring of the downlink control signal, thus achieving the effect of power saving in the terminal.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

DETAILED DESCRIPTION

In order to make the purposes, technical solutions and advantages of the present disclosure clearer, the implementations of the present disclosure will be further described in detail below in conjunction with the accompanying drawings.

The network architectures and service scenarios described in the embodiments of the present disclosure are for more clearly illustrating the technical solutions of the embodiments of the present disclosure, and do not constitute limitations on the technical solutions provided by the embodiments of the present disclosure. One of ordinary skill in this art will understand that, with the evolution of technologies and the emergence of new service scenarios, the technical solutions provided in the embodiments of the present disclosure are also applicable to similar technical problems.

Figure 1:
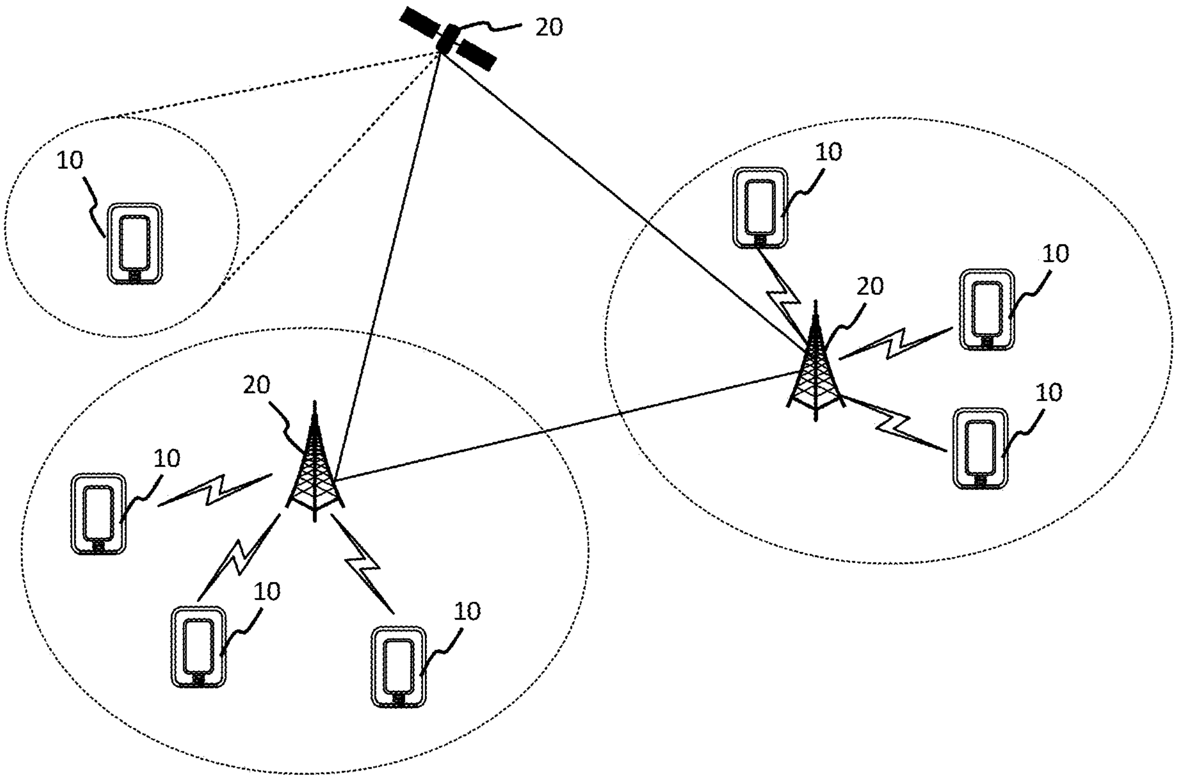
FIG. 1 is a schematic diagram of a network architecture of a communication system provided by an embodiment of the present disclosure.

FIG. 1 shows a schematic diagram of a network architecture of a communication system provided by an embodiment of the present disclosure. The network architecture may include: a terminal 10 and a base station 20.

There are usually multiple terminals 10, and one or more terminals 10 may be distributed in a cell managed by each base station 20. The terminal 10 may include various device, such as a handheld device with a wireless communication function, a vehicle-mounted device, a wearable device, a computing device or other processing device connected to a wireless modem, as well as various forms of user equipment (UE), mobile station (MS), terminal device and so on. For convenience of description, in the embodiments of the present disclosure, the above-mentioned devices are collectively referred to as a terminal.

The base station 20 is a device deployed in an access network to provide a wireless communication function for the terminal 10. The base station 20 may include various forms, such as a satellite base station, a macro base station, a micro base station, a relay station, an access point, and so on. In systems using different radio access technologies, the names of a device with the base station function may be different. For example, in 5G New Radio (NR) system, the device with the base station function is called gNodeB or gNB. The name "base station" may change as communication technology evolves. For convenience of description, in the embodiments of the present disclosure, the above-mentioned devices that provide the wireless communication function for the terminal 10 are collectively referred to as a base station.

Optionally, what is not shown in FIG. 1 is that the above network architecture also includes other network devices, such as: a central control node (Central Network Control, CNC), an Access and Mobility Management Function (AMF) device, a Session Management Function (SMF) or a User Plane Function (UPF) device, etc.

The "5G NR system" in the embodiments of the present disclosure may also be referred to as a 5G system or an NR system, but those skilled in the art can understand its meaning. The technical solutions described in the embodiments of the present disclosure may be applied to the 5G NR system, and may also be applied to a subsequent evolved system of the 5G NR system, or may also be applied to a system before the 5G NR system, such as the Long Term Evolution (LTE)system.

Before introducing the technical solutions shown in the later-described embodiments of the present disclosure, several terms and concepts involved in the present disclosure are firstly introduced.

1) 5G NR system

The 5G NR system is a new generation of wireless communication system proposed based on user requirements for wireless communication speed, delay, high-speed mobility, and energy efficiency, as well as the diversity and complexity of wireless communication services in future life. The main application scenarios of the 5G system are: Enhanced Mobile Broadband (eMBB), Ultra-reliable and Low Latency Communications (URLLC), Massive Machine Type Communication (mMTC).

In the 5G network environment, in order to reduce air interface signaling and quickly restore wireless connections and data services, a new Radio Resource Control (RRC) state is defined, that is, the RRC_INACTIVE state. This state is different from RRC idle state (RRC_IDLE) and RRC connected state (RRC_ACTIVE). The above three RRC states are as follows:

RRC_IDLE: Mobility is UE-based cell selection and reselection, paging is initiated by CN, paging area is configured by CN, and there is no UE AS context at the base station side, and there is no RRC connection between the UE and the base station.

RRC CONNECTED: There is an RRC connection between the UE and the base station, and the base station and the UE have the UE AS context. The network side knows the location of the UE at the specific cell level. Mobility is mobility controlled by the network side. Unicast data may be transmitted between the UE and the base station.

RRC_INACTIVE: Mobility is UE-based cell selection and reselection, there is a connection between CN-NR, UE AS context exists on a certain base station, paging is triggered by Radio Access Network (RAN), and RAN-based paging area is managed by the RAN, and the network side knows the location of the UE at the RAN-based paging area level.

2) Non Terrestrial Network (NTN)

At present, relevant standard organizations are studying NTN technology. NTN generally uses satellite communication to provide communication services to ground users. Compared with terrestrial cellular network communication, satellite communication has many unique advantages. First of all, satellite communication is not restricted by the user's region. For example, general land communication cannot cover areas such as oceans, mountains, deserts, etc. that cannot be equipped with communication equipment or are not covered by communication due to sparse population. For satellite communication, because a satellite can cover a large area of the ground and satellites can orbit the earth, theoretically every corner of the earth can be covered by satellite communications. Secondly, satellite communication has great social value. Satellite communication can be covered at a lower cost in remote mountainous areas, poor and backward countries or regions, so that people in these regions can enjoy advanced voice communication and mobile Internet technology, which is conducive to narrowing the digital gap with developed regions and promoting development of these areas. Thirdly, the distance of satellite communication is long, and the cost of communication does not increase significantly with the increase of communication distance. Finally, the stability of satellite communication is high, and it is not limited by natural disasters.

Communication satellites are divided into a Low-Earth Orbit (LEO) satellite, a Medium-Earth Orbit (MEO) satellite, a Geosynchronous Earth Orbit (GEO) satellite, a High Elliptical Orbit (HEO) satellite, etc. The NTN technology mainly studied at this stage is the communication technology based on the LEO satellite and the GEO satellite.

LEO satellite: a low-orbit satellite has an altitude range of 500 km to 1500 km, and the corresponding orbital period is about 1.5 hours to 2 hours. The signal propagation delay of single-hop communication between users is generally less than 20 ms. The maximum satellite visible time is 20 minutes. The signal propagation distance is short, the link loss is small, and the requirements for the transmit power of user terminals are not high.

GEO satellite: a geosynchronous orbit satellite with an orbital height of 35786 km and a rotation period around the earth of 24 hours. The signal propagation delay of single-hop communication between users is generally 250 ms.

In order to ensure satellite coverage and improve the system capacity of the entire satellite communication system, a satellite uses multi-beams to cover the ground. A satellite may form dozens or even hundreds of beams to cover the ground; a satellite beam may cover a ground area of tens to hundreds of kilometers in diameter.

Satellite beam: a satellite beam is the smallest unit that a satellite covers the earth's surface, corresponding to different directions. Usually, a satellite covers the earth's surface through hundreds or thousands of satellite beams. These satellite beams may be deployed as different cells or within the same cell. Considering the possible co-frequency interference between adjacent satellite beams, a frequency reuse factor greater than 1 is generally considered, that is, adjacent satellite beams are distinguished by different frequency points/carriers/frequency bands.

At present, in the R17 NTN standardization, two NTN scenarios, i.e., a transparent payload NTN and a regenerative payload NTN, are mainly studied. An NTN network usually consists of the following network elements:

1. One or more gateways, used to connect a satellite and a terrestrial common network.
2. Feeder link: a link used for communication between the gateway(s) and the satellite.
3. Service link: a link used for communications between a terminal and the satellite.
4. Satellite: in terms of the functions that the satellite provides, the satellite can be divided into a satellite based on transparent payload and a satellite based on regenerative payload.

Transparent payload: the satellite only provides the functions of wireless frequency filtering, frequency conversion and amplification, that is, it only provides transparent forwarding of signals, and will not change the waveform signal it forwards.

Regenerative payload: in addition to the functions of wireless frequency filtering, frequency conversion and amplification, the satellite can also provide the functions of demodulation/decoding, routing/conversion, coding/modulation, that is to say, the satellite has a part or all functions of a base station.

5. Inter-satellite link: in the scenario of regenerative payload, the link is used for communications between satellites.

Figure 2:
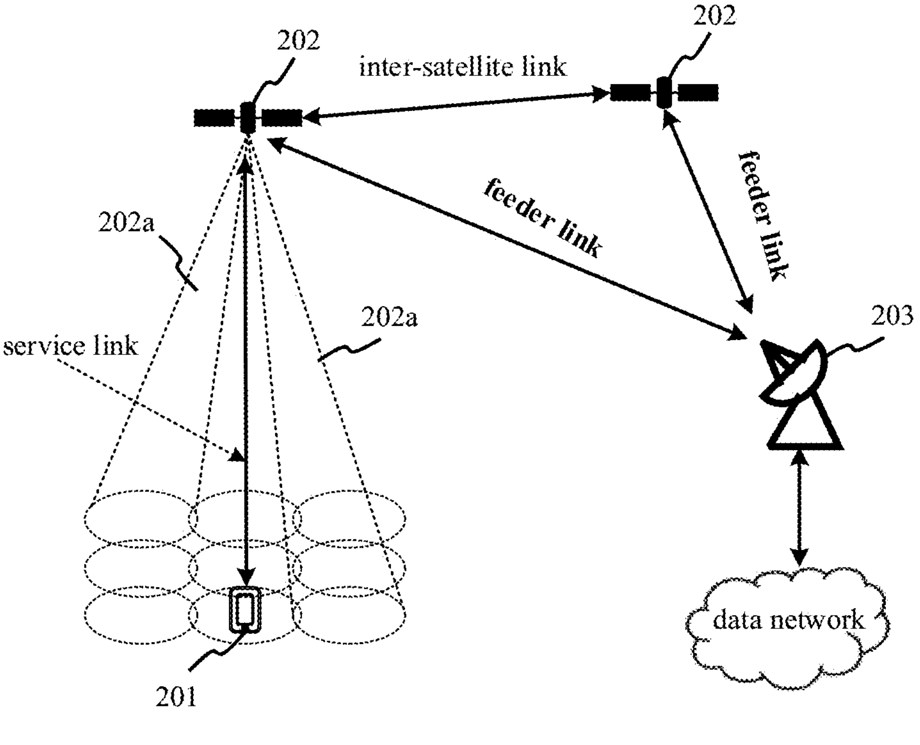
FIG. 2 is a network architecture diagram of a NTN system provided by an embodiment of the present disclosure.

FIG. 2 shows a network architecture diagram of an NTN system provided by an embodiment of the present disclosure. As shown in FIG. 2, the NTN system includes a terminal 201, a satellite 202, and a gateway device 203. The satellite 202 is connected to the gateway device 203 in a wireless manner (feeder link), the satellites 202 are connected in a wireless manner (inter-satellite link), and the gateway device 203 is connected to a data network. The satellite 202 covers the surface of the earth through multiple satellite beams 202*a*, and each beam covers a certain area. When the terminal 201 is within the coverage of a satellite beam 202*a*, the terminal 201 may initiate random access to the base station 202 to establish a service link, and perform subsequent communications.

3) Early Data Transmission (EDT)

EDT was introduced in LTE. During this procedure, a UE may always remain in an RRC-IDLE state, a suspend state or an RRC_INACTIVE state, to complete the transmission of uplink and/or downlink small data packets. For example, the flow of the EDT user plane transmission solution may be as follows:

S1, the UE selects one of preamble groups used to indicate EDT and sends it to an eNB to initiate the EDT transmission procedure. After receiving the corresponding preamble, the eNB configures an uplink resource and a TA for EDT for the UE through RAR.

S2, the UE sends an RRC Connection Resume Request message to the eNB, including a Resume ID, an RRC connection resume cause (establishment cause), an authentication token (shortResumeMAC-I). The UE side resumes all Signalling Radio Bearers (SRBs) and Data Radio Bearers (DRBs), and derive a new key by NextHop Chaining Count (NCC) included in the last connection release message. User data is encrypted and transmitted on a Dedicated Traffic Channel (DTCH), and multiplexed with RRC Connection Resume Request.

S3, the eNB establishes the S1 connection, initiates a context resume procedure to a Mobility Management Entity (MME) and reactivates a bearer between S1-U.

S4, the MME initiates a request to the Serving GateWay (S-GW) to reactivate the bearer between UE S1-U, so as to deliver subsequent user data to the S-GW.

S5, the MME confirms to the eNB to resume the UE context.

S6, the user data is delivered to the S-GW.

S7, if the S-GW has downlink data to send at this time, the S-GW delivers the downlink data to Enb.

S8, the eNB suspends the S1 connection, and the MME deactivates the bearer between UE S1-U.

S9, the eNB sends an RRC Connection Release message to the UE, and keeps the UE in the suspend state.

For the above data transmission, in fact, the UE completes the transmission of the small data packets without entering the connected state. In terms of configuration, the network configures on SIB2 a maximum Transport Block Size, (TBS) that the current network allows to transmit, UE determines the amount of data to be transmitted; if the amount of data to be transmitted is smaller than the broadcast maximum TB size, the UE can initiate EDT transmission; otherwise, the UE uses a normal connection establishment procedure to enter a connected state to transmit data.

4) Transmission Based on a Preconfigured Uplink Resource (PUR)

In LTE R1 6, the uplink small data transmission in Narrow Band Internet of Things (NB-IoT) and Enhanced Machine Type Communication (eMTC) scenarios has been further enhanced, and a method of using a preconfigured uplink resource (PUR) for data transmission in the IDLE state is introduced. When a cell where a UE resides in supports PUR transmission, the UE can request PUR configuration through PUR configuration request (PURConfiguration Request) in the connected state. The PURConconfiguration Request can optionally include the requested PUR cycle, TBS, number of PURs, etc. The (ng-)eNB configures the PUR for the UE by including a PUR-Config field in the RRCConnectinRelease message, while releasing the UE to the IDLE state. The configuration of the PUR is determined by the (ng-)eNB and may be based on the UE request, the UE registration information and/or a local policy.

The PUR is only valid in the currently configured cell, that is, when the UE detects a cell change and initiates random access in a new cell, the UE needs to release the PUR configured in the original cell.

In the user plane function optimization scheme of the Evolved Packet System (EPS)/5G system (5GS) cellular Internet of Things, before the UE in the IDLE state uses PUR for data transmission, the following prerequisites need to be met:

1. Effective TA; the following two conditions need to be met:

if PUR-Time Alignment Timer is configured: the MAC layer confirms that the PUR-TimeAlignmentTimer is running;

if a Reference Signal Receiving Power (RSRP) change threshold (i.e. PUR-RSRP-ChangeThreshold or PUR-NRSRP-ChangeThreshold) is configured: the change in RSRP (increase or decrease) since the most recent TA validity verification is not greater than the configured RSRP change threshold.

2. NCC; included in the RRCCconnectionRelease message, and used for the derivation of a new key;

3. Effective PUR;

4. There is an RRC connection establishment or resume need, such as arrival of uplink data;

For the EPS/5GS cellular IoT user plane function optimization solution, the UE in IDLE state uses PUR to perform data transmission, and the procedure may be as follows:

S1, the UE meets the above prerequisites for PUR transmission.

S2, the UE sends RRCConconnectionResumeRequest message to eNB/ng-eNB, including a Resume ID (corresponding to EPS scenario)/Inactive-Radio Network Temporary Identity (I-RNTI) (corresponding to 5GS scenario), an establishment cause, and a shortResume MAC-I. The Resume ID/IRNTI is used by the base station to identify the context of the UE in the suspend state, and the shortResumeMAC-I is used for identity verification. UE resumes all SRBs and DRBs, and uses the NCC contained in the RRCConnectionRelease message of the last connection to derive a new key, and user data is encrypted and transmitted on the DTCH, and is multiplexed with RRCConnectionResumeRequest on the Common Control Channel (CCCH).

S3, the same steps as the MO-EDT transmission procedure under the EPS/5GS cellular IoT user plane function optimization solution.

S4, after the eNB/ng-eNB delivers the user data to the core network, the UE is kept in the IDLE state through the RRCConnectionRelease message, and the RRCConnectionRelease contains the following information:

a) Release Cause being set to RRC-Suspend;

b) resume ID/I-RNTI;

c) NCC;

d) DRB-ContinueROHC.

If the network has downlink data to send, it is encrypted and transmitted through the DTCH, and multiplexed with the RRCConnectionRelease message on the Dedicated Control CHannel (DCCH).

To support PUR transmission, the RRC layer provides the following configuration parameters to the MAC layer:

PUR-RNTI; PUR response window length (PUR-ResponseWindowSize); uplink (UL) grant configuration information.

After the UE performs transmission using PUR, if the last subframe used for the uplink Physical Uplink Shared Channel (PUSCH) transmission is subframe n, then the UE starts pur-ResponseWindowTimer in subframe n+4, and monitors the Physical Downlink Control Channel (PDCCH) scrambled by PUR-RNTI during the running of pur-responseWindowTimer.

The duration of PUR-ResponseWindowTimer is PUR-ResponseWindowSize.

During the running of PUR-ResponseWindowTimer, if the UE receives PDCCH scrambled by PUR-RNTI, and the PDCCH indicates an uplink grant for uplink retransmission, then the UE performs retransmission on the uplink grant resource. Assuming that the last subframe used for the retransmitted PUSCH transmission is subframe m, the UE restarts the PUR-ResponseWindowTimer in subframe m+4.

If the MAC layer receives the L1 ACK for the PUR transmission from the lower layer, or the UE receives the PDCCH scrambled by PUR-RNTI and the MAC layer Protocol Data Unit (PDU) is successfully decoded, the UE stops PUR-ResponseWindowTimer; otherwise, if the MAC receives a fallback indication for the PUR transmission from the lower layer, the UE stops the PUR-ResponseWindow- Timer, and at the same time indicates to the upper layer that the PUR fallback indication has been received, and discards the PUR-RNTI.

If the PUR-ResponseWindowTimer expires, the MAC layer indicates to the upper layer that the uplink transmission using the PUR fails, and discards the PUR-RNTI.

In order for UE to maintain TA so that PUR can be used for small data transmission, the upper layer can configure a timer, PUR-TimeAlignmentTimer, for the MAC layer.

When the MAC layer receives the PUR-TimeAlignment-Timer configuration from the upper layer, if the PUR-TimeAlignmentTimer is not running, the MAC layer starts the PUR-TimeAlignmentTimer.

When the MAC layer receives PUR-TimeAlignment-Timer release configuration from the upper layer, if the PUR-TimeAlignmentTimer is running, the MAC layer stops the PUR-TimeAlignmentTimer.

If a Timing Advance Command (TAC) MAC layer Control Element (CE) is received or PDCCH indicates TA adjust, TA is adjusted based on the TAC MAC CE or PDCCH indication, and the PUR-TimeAlignmentTimer is started or restarted at the same time.

When determining the validity of TA, whether the TA timer is running may be confirmed to the MAC layer. When the TA timer expires, the MAC layer needs to feed this back to the upper layer.

Rel-17 has established a project to carry out research on small data transmission under RRC_INACTIVE. There are two main objectives of the project: uplink small data transmission based on random access procedure (two-step/four-step) and uplink small data transmission based on a preconfigured resource, such as Configured Grant (CG) type1.

In the related art, on the one hand, considering the turnaround time between terminal receiving and transmission operations, the UE will start the UPR response window timer at an interval of 4 subframes after sending small data using PUR. The currently supported 4 ms interval mainly considers the terminal processing delay after the terminal sends the uplink transmission (for example, for NB-IoT, the UE needs to switch from uplink transmission to downlink reception), and the fastest round-trip time RTT from when the UE finishes sending the uplink transmission to receiving the network response. In the terrestrial network, the RTT time of the signal transmission between UE and the network is relatively short, so the time interval between UE sending the uplink transmission and starting the PUR response window timer mainly depends on the processing delay of the terminal.

Compared with the traditional terrestrial cellular network, the signal propagation delay between the UE and the network in NTN is greatly increased, and its RTT can even be much greater than the terminal processing time considered in the existing standards, and thus it is necessary to redefine the value of a start time offset of the PUR response window timer.

On the other hand, in the LTE terrestrial network, the UE's TA is completely controlled by the network, and the UE in the RRC-IDLE state needs to verify the validity of the TA before using the PUR for uplink transmission. Only when TA is valid can PUR be used for uplink transmission. At present, R17 NTN needs to support UE with a Global Navigation Satellite System (GNSS) positioning capability and a TA pre-compensation capability. For this type of UE, there is no solution in related art to perform TA estimation based on its own positioning capability.

Small Data Transmission (SDT) currently being researched by R17 NR has problems similar to the PUR transmission in LTE for the scenario where the UE in the RRC INACTIVE state uses CG for small data transmission. For example, how does the UE determine a valid TA before using the CG to perform transmission, when does the UE start to monitor a response from the network after completing the small data transmission using the CG, and so on.

The solutions shown in the subsequent embodiments of the present disclosure propose a solution in which the terminal adjusts the monitoring start time and/or the monitoring duration when performing uplink small data transmission, and the terminal autonomously performs TA estimation. Exemplarily, the solutions involved in the present disclosure can be applied in a communication scenario where the round-trip propagation delay of wireless signals between the terminal and the network side is relatively large, such as NTN network, so that the terminal can obtain accurate TA when performing uplink small data transmission, and more accurate control of the monitoring time of the response from the network side, thereby improving the transmission effect of uplink small data, and also avoiding unnecessary monitoring of the terminal to achieve the purpose of terminal power saving.

Figure 3:
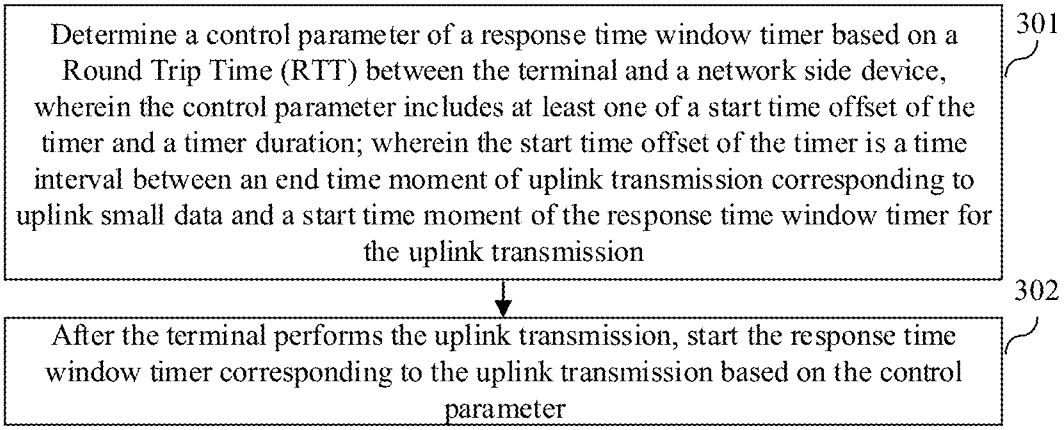
FIG. 3 is a flowchart of a timer starting method provided by an embodiment of the present disclosure.

FIG. 3 shows a timer starting method provided by an embodiment of the present disclosure. The method may be performed by a terminal, and the terminal may be a terminal in the network architecture shown in FIG. 1 or FIG. 2. The method may include the steps:

In step 301, the terminal determines a control parameter of a response time window timer based on a Round Trip Time (RTT) between the terminal and a network side device. The control parameter includes at least one of a start time offset of the timer and a timer duration. The start time offset of the timer is a time interval between an end time moment of uplink transmission corresponding to uplink small data and a start time moment of the response time window timer for the uplink transmission.

In step 302, after the terminal performs the uplink transmission, the terminal starts the response time window timer corresponding to the uplink transmission based on the control parameter.

To sum up, in the solution shown in the embodiment of the present disclosure, for the response time window timer corresponding to the uplink transmission corresponding to the uplink small data, the terminal can determine more accurately, based on the RTT between the terminal and the network side device, the start time offset of the timer and/or the duration of the timer, so as to more accurately control the time for monitoring the response from the network side, thereby achieving accurate reception of the response and improving the transmission effect of uplink small data. In addition, the solution can avoid unnecessary monitoring by the terminal to achieve the purpose of terminal power saving.

Figure 4:
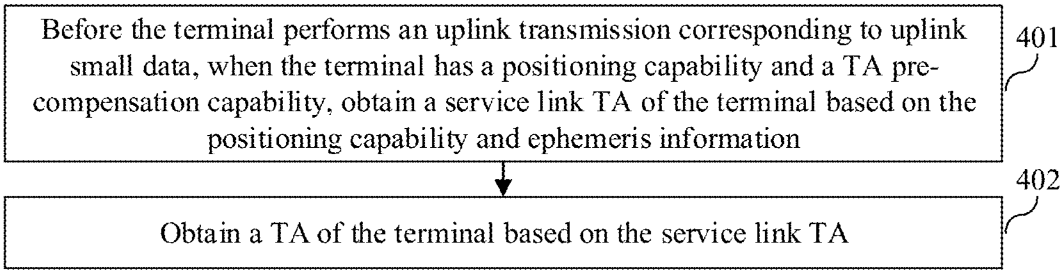
FIG. 4 is a flowchart of an uplink advance obtaining method provided by an embodiment of the present disclosure.

FIG. 4 shows an uplink advance obtaining method provided by an embodiment of the present disclosure. The method may be performed by a terminal. The terminal may be a terminal in the network architecture shown in FIG. 1 or FIG. 2. The method may include the steps as follows:

In step 401, before the terminal performs the uplink transmission corresponding to the uplink small data, when the terminal has a positioning capability and a TA pre-compensation capability, the terminal obtains a service link TA of the terminal based on the positioning capability and ephemeris information.

The above-mentioned ephemeris information refers to satellite ephemeris corresponding to a satellite in the NTN system. Satellite ephemeris, also known as Two-Line Orbital Element (TLE), is an expression used to describe the position and velocity of spaceflight objects (also known as a two-line orbital data system).

The satellite ephemeris uses a mathematical relationship between six orbital parameters of Kepler's law to determine the time, coordinates, azimuth, speed and other parameters of a flying object, which has extremely high precision.

Satellite ephemeris can accurately calculate, predict, describe, and track the operation status such as time, position, or speed of a satellite or a flying object; can express precise parameters of a flying object such as a celestial body, a satellite, a spacecraft, a missile, or a space junk; can place a flying object in a three-dimensional space; can use time to describe the past, present and future of a celestial body three-dimensionally.

The time of the satellite ephemeris is calculated according to the Universal Time Coordinated (UTC); the satellite ephemeris can be updated regularly.

In a possible implementation, the foregoing service link refers to a link in the NTN network between a terminal and a satellite in the NTN network. Correspondingly, the service link TA (i.e., TA_service link) is a TA that needs to be compensated due to the influence of the service link.

In step 402, based on the service link TA, the TA of the terminal is obtained.

The TA of the terminal refers to a TA used when the terminal performs uplink transmission.

Since in the NTN network, the distance between the terminal and the satellite is usually very large, and there may also be a large change, the distance between the terminal and the satellite also has a great influence on the two. In order to make a wireless signal sent by the terminal be received by the satellite at an accurate time point, in the embodiments of the present disclosure, the terminal can obtain the service link TA based on the positioning capability and the ephemeris information, and then estimate the TA of the terminal based on the service link TA.

In view of the above, in the solutions shown in the embodiments of the present disclosure, when there is a service link between the terminal and the network side device, the terminal can, based on the positioning capability and the ephemeris information, obtain the service link TA to be compensated due to the distance influence of the service link in NTN, and then obtain the TA of the terminal according to the service link TA. Thus, the solutions can realize accurate prediction of the TA required by the terminal for uplink transmission, and reduce the influence of the communication distance between the terminal and the satellite in the NTN network on the uplink transmission corresponding to the uplink small data as much as possible, thereby improving the accuracy of the uplink transmission in the NTN network.

The control scheme for the response time window timer provided by the embodiment shown in FIG. 3 above can be used independently of the scheme for TA prediction by the terminal provided by the embodiment shown in FIG. 4 above.

Alternatively, the control scheme for the response time window timer provided by the embodiment shown in FIG. 3 above may be used in conjunction with the scheme for TA prediction by the terminal provided by the embodiment shown in FIG. 4 above. For example, in an NTN network, the terminal may first perform TA prediction, and obtain the start time offset and/or timer duration of the response time window timer based on the RTT, and then the terminal performs uplink transmission corresponding to the uplink small data according to the predicted TA, and after the uplink transmission, the terminal may start the response time window timer according to the start time offset of the timer and/or the duration of the timer.

Figure 5:
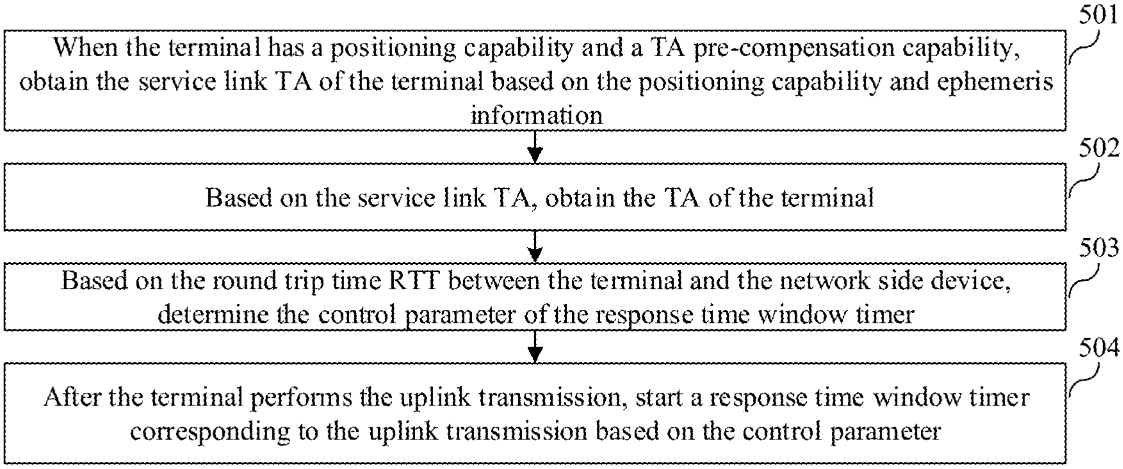
FIG. 5 is a flowchart of an uplink transmission method provided by an embodiment of the present disclosure.

Taking a combination of the control scheme for the response time window timer provided in the embodiment shown in FIG. 3 above and the scheme for TA prediction by a terminal provided in the embodiment shown in FIG. 4 above as an example, FIG. 5 shows an uplink transmission method provided by an embodiment of the present disclosure. The method may be performed by a terminal. The terminal may be the terminal in the network architecture shown in FIG. 1 or FIG. 2. The method may include the steps as follows:

In step 501, when the terminal has a positioning capability and a TA pre-compensation capability, the terminal obtains the service link TA of the terminal based on the positioning capability and ephemeris information.

In a possible implementation, the terminal is a terminal in a non-Radio Resource Control (RRC) connected state.

The terminal being in the non-RRC connected state may refer to the terminal being in the RRC_IDLE state, or in the RRC_INACTIVE state.

In an embodiment of the present disclosure, in the NTN network, the UE may locate its own position based on the positioning capability, and the position of the serving satellite may be calculated according to the ephemeris information, and the distance of the service link may be calculated through the two position information. Through the distance of the service link and the propagation rate of a wireless signal, the delay for the wireless signal sent by the terminal to the satellite location may be calculated, and the service link TA may be calculated according to the delay, for example, service link TA=2*delay.

In step 502, based on the service link TA, the TA of the terminal is obtained.

The NTN system may include different network architectures. For example, the current NTN includes a NTN based on a transparent forwarding architecture and a NTN based on a regenerative forwarding architecture. For different NTN architectures, the corresponding manners for obtaining the TA of the terminal based on the service link TA may be different.

In a possible implementation, when the network where the terminal resides in is the NTN based on the transparent forwarding architecture, and the terminal receives a common TA indicated by the system, the sum of the service link TA and the common TA is taken as the TA of the terminal.

In an example solution of embodiments of the present disclosure, if the current NTN is the NTN based on the transparent forwarding architecture, and the system indicates the common TA, for example, the system indicates a TA for a NTN cell by broadcasting, then the TA of the terminal may be set as the service link TA+the common TA.

In an example solution, the system may also indicate the common TA through other manners than broadcasting, for example, through RRC signaling, downlink control information, etc., and embodiments of the present disclosure do not impose specific limitations on the manners for the system to indicate the common TA.

In a possible implementation, when the network where the terminal resides in is the NTN based on the transparent forwarding architecture, and the terminal does not receive the common TA indicated by the system, the service link TA is used as the TA of the terminal.

In an example solution of the embodiments of the present disclosure, if the current NTN is the NTN based on the transparent forwarding architecture, and the system does not indicate the common TA, the terminal may directly use the above service link TA as the TA of the terminal.

In a possible implementation, when the network where the terminal resides in is the NTN based on the regenerative forwarding architecture, the service link TA is used as the TA of the terminal.

In an example solution of the embodiment of the present disclosure, if the current NTN is the NTN based on the regenerative forwarding architecture, the terminal may directly use the service link TA as the TA of the terminal.

In a possible implementation, before the terminal performs the uplink transmission corresponding to the uplink small data, when the terminal has the positioning capability and the TA pre-compensation capability, the terminal obtains the service link TA of the terminal based on the positioning capability and the ephemeris information without verifying the validity of the TA maintained by the terminal, and obtains the TA of the terminal based on the service link TA.

In an embodiment of the present disclosure, for a terminal in NTN, when the terminal has the positioning capability and the TA pre-compensation capability and is in the RRC_IDLE state or RRC_INACTIVE state, the terminal may not verify the validity of the TA maintained by itself, and the terminal may obtain the service link TA of the terminal directly based on the positioning capability and the ephemeris information, and may obtain the TA of the terminal based on the service link TA.

In another possible implementation, before the terminal performs the uplink transmission corresponding to the uplink small data, the validity verification of the TA maintained by the terminal may be performed. When the TA maintained by the terminal fails the validity verification, and the terminal has the positioning capability and the TA pre-compensation capability, the terminal may obtain the service link TA of the terminal based on the positioning capability and the ephemeris information, and obtain the TA of the terminal based on the service link TA.

In the embodiment of the present disclosure, for a terminal in NTN, when the terminal has the positioning capability and the TA pre-compensation capability and is in RRC_IDLE state or RRC_INACTIVE state, if there is a need to send uplink small data, the terminal may first verify the validity of the TA maintained by the terminal. If the TA maintained by the terminal fails the validity verification, then when the terminal has the positioning capability and the TA pre-compensation capability, the terminal may, based on the positioning capability and the ephemeris Information, obtain the service link TA of the terminal, and obtain the TA of the terminal based on the service link TA.

In a possible implementation, when the TA maintained by the terminal passes the validity verification, the TA maintained by the terminal is used as the TA of the terminal.

In an embodiment of the present disclosure, for a terminal in NTN, when the terminal has the positioning capability and the TA pre-compensation capability and is in RRC_IDLE state or RRC_INACTIVE state, if there is a need to send uplink small data, the terminal may first perform the validity verification of the TA maintained by the terminal. If the TA maintained by the terminal passes the validity verification, the terminal does not need to obtain the TA again, that is, the terminal can directly use the currently maintained TA.

After the terminal determines the TA of the terminal, the terminal may perform uplink transmission based on the TA of the terminal when there is uplink small data.

In step 503, based on the round trip time RTT between the terminal and the network side device, the terminal determines the control parameter of the response time window timer.

The control parameter includes at least one of the start time offset of the timer and the duration of the timer. The start time offset of the timer is a time interval between an end time moment of uplink transmission corresponding to uplink small data and a start time moment of the response time window timer for the uplink transmission.

In an embodiment of the present disclosure, when the terminal has uplink small data to be transmitted, the start time offset and/or timer duration of the response time window timer can be determined based on the round-trip time RTT between the terminal and the network side device, so as to control the monitoring time for the response from the network side after the uplink transmission corresponding to the uplink small data is performed.

For uplink small data, in a case of uplink transmission performed based on different resources, the determination method of the start time offset is also different.

In a possible implementation, when the uplink transmission is a transmission performed based on a preconfigured uplink resource (PUR), or an uplink retransmission based on indication of a PDCCH scrambled based on a PUR-Radio Network Temporary Identity (PUR-RNTI), the start time offset is the maximum value of the RTT and a first time offset; or, the start time offset is the RTT.

In an embodiment of the present disclosure, for the uplink transmission performed based on PUR, or for the retransmission of the uplink transmission performed based on PUR, the above start time offset may be the maximum value selected from RTT and the first time offset, or RTT may be directly used as the start time offset.

In a possible implementation, the value of the first time offset is a predefined value.

In a possible implementation, the first time offset is 4 subframes.

The above-mentioned first time offset may be a predefined value, for example, a value predefined by a protocol, or a value predefined by a system (for example, the system indicates the value in advance through broadcast or downlink signaling).

The foregoing first time offset may be 4 subframes, or may be other time lengths, such as 3 subframes or 5 subframes, and so on.

In a possible implementation, when the uplink transmission is a transmission performed based on a configured grant (CG) resource, or an uplink retransmission based on indication of a PDCCH scrambled by a first RNTI, the start time offset may be the maximum value between RTT and a second time offset, or the start time offset may be the RTT. The first RNTI is used to indicate retransmission scheduling for CG transmission in the RRC INACTIVE state.

In a possible implementation, the value of the second time offset is a predefined value.

In another possible implementation, the value of the second time offset is a time interval from a completion of the first repetition of the uplink PUSCH transmission performed by the terminal to a next PDCCCH monitoring occasion.

In another possible implementation, the value of the second time offset is a time interval from a completion of the last repetition of the uplink PUSCH transmission performed by the terminal to a next PDCCCH monitoring occasion.

In the embodiments of the present disclosure, for the uplink transmission performed based on a CG resource, or for the retransmission of uplink transmission performed based on a CG resource, RTT may be directly used as the start time offset, or the maximum value between the RTT and the second time offset may be used as the start time offset.

In a possible implementation, the timer duration is determined based on a duration offset and an initial timer duration, and the initial timer duration is configured by the network.

In an embodiment of the application, the terminal may determine a duration offset based on the round-trip time RTT, and adjust the timer duration based on the duration offset. That is, based on the duration offset and the network configured initial timer duration, the actually used timer duration may be determined.

In a possible implementation, the timer duration is the sum of the duration offset and the initial timer duration.

In an embodiment of the present disclosure, when determining the actually used timer duration by taking the duration offset and the initial timer duration configured by the network into consideration, the terminal may directly add the duration offset to the initial timer duration to obtain the above timer duration.

Alternatively, when determining the actually used timer duration by taking the duration offset and the initial timer duration configured by the network into consideration, the terminal may also determine the timer duration in other ways. For example, the terminal may directly use the duration offset as the above timer duration; or, the duration offset plus half of the initial timer duration may be used as the above timer duration. Embodiments of the present disclosure do not impose specific limitations on the manner for the terminal to determine the actually used timer duration based on the duration offset and the initial timer duration configured by the network.

For uplink small data, in a case of uplink transmission performed based on different resources, the determination method of the duration offset is also different.

In a possible implementation, when the uplink transmission is a transmission performed based on PUR, or an uplink retransmission based on based on an indication of a PDCCH scrambled by the PUR-RNTI:

- the duration offset is a difference between a third time offset and the maximum value of the RTT and the third time offset;
- or, the duration offset is a difference between the RTT and the third time offset.

In an embodiment of the present disclosure, for the uplink transmission performed based on PUR, or for the retransmission of the uplink transmission performed based on PUR, the above-mentioned duration offset for adjusting the duration of the timer may be a difference between the third time offset and the maximum value selected between the RTT and the third time offset, or the difference between RTT and the third time offset may be directly used as the duration offset.

In a possible implementation, the value of the third time offset is a predefined value.

In a possible implementation, the third time offset is 4 subframes.

The third time offset may be a predefined value, for example, a value predefined by a protocol, or a value predefined by a system (for example, the system indicates the value in advance through broadcast or downlink signaling).

The foregoing third time offset may be 4 subframes, or may be other time lengths, such as 3 subframes or 5 subframes, and so on.

The above-mentioned first time offset and the third time offset may be the same time offset; or, the above-mentioned first time offset and the third time offset may be different time offsets.

In a possible implementation, when the uplink transmission is a transmission performed based on a CG resource, or an uplink retransmission based on an indication of a PDCCH scrambled by the first RNTI, the duration offset is the RTT.

In an embodiment of the application, for the uplink transmission performed based on a CG resource, or for the retransmission of uplink transmission performed based on a CG resource, a difference between RTT and a fourth time offset may be used as the duration offset, or a difference between the fourth time offset and the maximum value between the RTT and the fourth time offset may be used as the duration offset.

In a possible implementation, the value of the fourth time offset is a predefined value.

In another possible implementation, the value of the fourth time offset is a time interval from a completion of the first repetition of the uplink PUSCH transmission performed by the terminal to a next PDCCCH monitoring occasion.

In another possible implementation, the value of the fourth time offset is a time interval from a completion of the last repetition of the uplink PUSCH transmission performed by the terminal to a next PDCCCH monitoring occasion.

In a possible implementation, the Hybrid Automatic Repeat reQuest (HARQ) process used for the uplink transmission is an HARQ process with an uplink HARQ retransmission function enabled.

In an embodiment of the present disclosure, for the uplink HARQ process, enabling the uplink HARQ retransmission function means that the network side performs retransmission scheduling based on the decoding result of the uplink receipt.

In a possible implementation, when the network where the terminal resides in is a NTN based on a transparent forwarding architecture, the RTT is the round-trip propagation delay of a wireless signal between the terminal and a ground base station in the NTN.

In the NTN based on the transparent forwarding architecture, the satellite does not assume the function of a base station, and thus the round-trip delay between the terminal and the network side is a delay related to the round-trip propagation of a wireless signal between the terminal and the ground base station. That is to say, the above RTT corresponds to the sum of the time length for the wireless signal sent from the terminal to be forwarded to the ground base station through the satellite, and the time length for the wireless signal sent from the ground base station to be forwarded to the terminal through the satellite.

In a possible implementation, when the terminal receives a first common offset indicated by the system, the RTT is the sum of the first common offset and the uplink advance TA of the terminal.

In a possible implementation, when the terminal does not receive the first common offset indicated by the system, the RTT is the TA of the terminal.

In an embodiment of the present disclosure, in the NTN based on the transparent forwarding architecture, when the terminal obtains the RTT, the RTT may be calculated based on the TA of the terminal.

In an example solution of the embodiments of the present disclosure, if the current NTN is the NTN based on the transparent forwarding architecture, and the system indicates the common offset, for example, the system indicates the common offset by broadcasting, etc., the RTT between the terminal and the network side may be set to common offset+TA of the terminal.

Or, if the current NTN is the NTN based on the transparent forwarding architecture, the terminal may calculate the RTT based on the TA of the terminal and the first common offset. For example, on the basis of the TA of the terminal, the first common offset multiplied by a coefficient (e.g., 1.2) may be added to obtain the RTT. Embodiments of the present disclosure do not limit the manner in which the terminal obtains the RTT based on the TA of the terminal and the first common offset.

In an example solution, the system may indicate the common offset in other manners than broadcasting, for example, through RRC signaling, or downlink control information, etc., and embodiments of the present disclosure do not limit the manner for the system to indicate the common offset.

In another example solution of the embodiments of the present disclosure, if the current NTN is the NTN based on the transparent forwarding architecture, and the system does not indicate the common offset, the terminal may directly use the TA of the terminal as the RTT between the terminal and the network side.

Or, if the current NTN is the NTN based on the transparent forwarding architecture, the terminal may also calculate RTT based on the TA of the terminal. For example, the TA of the terminal is multiplied by a coefficient (such as 1.2) to obtain the above RTT. Embodiments of the present disclosure do not limit the manner in which the terminal obtains the RTT based on the TA of the terminal.

In a possible implementation, when the network where the terminal resides in is the NTN based on the regenerative forwarding architecture, the RTT is a round-trip propagation delay of a wireless signal between the terminal and a satellite in the NTN.

In the NTN based on the regenerative forwarding architecture, a satellite undertakes part or all of the functions of a base station, and therefore, the round-trip delay between the terminal and the network side is a delay related to the round-trip propagation of a wireless signal between the terminal and the satellite. That is to say, the above RTT corresponds to the time length for the wireless signal sent from the terminal to propagate to the satellite.

In a possible implementation, the RTT is the TA of the terminal.

In an example solution of the embodiments of the present disclosure, if the current NTN is the NTN based on the regenerative forwarding architecture, the terminal may directly use the TA of the terminal as the RTT between the terminal and the network side.

Alternatively, if the current NTN is the NTN based on the regenerative forwarding architecture, the terminal may calculate the RTT based on the TA of the terminal. For example, the TA of the terminal may be multiplied by a coefficient (such as 1.2) to obtain the above RTT. Embodiments of the present disclosure do not limit the manner in which the terminal obtains the RTT based on the TA of the terminal.

In step 504, after the terminal performs the uplink transmission, a response time window timer corresponding to the uplink transmission is started based on the control parameter.

In an embodiment of the present disclosure, after the terminal performs the uplink transmission corresponding to the uplink small data according to the TA, the terminal may start a response time window timer corresponding to this uplink transmission based on the start time offset of the timer and/or the timer duration, and during the running of the response time window timer, the terminal monitors a response from the network side for this uplink transmission.

For example, when the above control parameter includes the start time offset of the timer, the terminal starts the response time window timer in a subframe obtained by adding the start time offset to a subframe where the uplink transmission ends. Optionally, in this case, the duration of the response time window timer may be a duration preconfigured by the system (that is, the initial timer duration).

For another example, when the control parameter includes the timer duration, after the uplink transmission ends and when the start time of the response time window timer arrives, the terminal starts the response time window timer whose operation duration is the timer duration. Optionally, in this case, the start time of the response time window timer may be a preset start time. For example, the start time of the response time window timer may be the fourth subframe after the uplink transmission end moment.

For another example, when the control parameter includes the start time offset of the timer and the timer duration, the terminal starts the response time window timer in a subframe obtained by adding the start time offset to a subframe where the uplink transmission ends, and sets the duration of the response time window timer to the above timer duration.

The embodiments of the present disclosure provide a method for sending uplink small data by a non-connected UE in NTN. On the one hand, the method can effectively use the TA pre-compensation capability of the UE for uplink transmission. On the other hand, after the uplink transmission is completed by the UE using a configured uplink grant, the time moment when the UE starts the response window timer can be well adapted to the NTN scenario, so as to achieve the purpose of terminal power saving.

In view of the above, in the solutions shown in the embodiments of the present disclosure, for the response time window timer corresponding to the uplink transmission corresponding to the uplink small data, the terminal can determine more accurately, based on the RTT between the terminal and the network side device, the start time offset of the timer and/or the timer duration, so as to more accurately control the time for monitoring the response from the network side, thereby achieving accurate reception of the response and improving the transmission effect of uplink small data. In addition, the solutions can prevent the terminal from unnecessary monitoring of a downlink control signal, so as to achieve the effect of power saving of the terminal.

In addition, in the solutions shown in the embodiments of the present disclosure, when there is a service link between the terminal and the network side device, the terminal can, based on the positioning capability and ephemeris information, obtain the service link TA to be compensated due to influence of the distance of the service link in the NTN, and obtain the TA of the terminal according to the service link TA. Thus, the solutions can accurately predict the TA required for the terminal's uplink transmission, and reduce the influence of the communication distance between the terminal and a satellite in the NTN network on the uplink transmission corresponding to uplink small data as much as possible, thereby improving the accuracy of the uplink transmission in the NTN network.

In an example solution based on the above-mentioned embodiment shown in FIG. 5, the procedure for a NB-IoT or eMTC terminal in the IDLE state to use the PUR to transmit small data may be as follows:

For a UE having both the positioning capability and the TA pre-compensation capability, the UE sends small data on the PUR based on the valid TA maintained by the UE itself; or, the UE determines the TA of the UE based on the GNSS positioning capability and ephemeris information, and/or the common TA broadcasted by the network, and sends small data on the PUR. For this procedure, reference may be made to the descriptions with respect to step 501 and step 502 in the above-mentioned embodiment shown in FIG. 5, which will not be repeated here. After the UE completes the PUR-based transmission, the start time moment of the PUR response window timer is determined according to the signal transmission round-trip delay RTT between the UE and the network side.

The implementation procedure is as follows:

In step 1, NB-IoT or the eMTC UE receives an RRC release message from the network, indicating to release the UE to the RRC_IDLE state. The RRC release message contains PUR-Config (PUR configuration). The UE in the RRC_IDLE state uses PUR to send uplink data.

For the UE having both the positioning capability and the TA pre-compensation capability, the UE first determines its own TA before using PUR to send uplink transmission, and uses the determined TA to send PUSCH on PUR. The method for UE to determine TA is as follows:

Method 1: UE does not need to verify the validity of TA.

The UE determines its own TA based on the GNSS positioning capability and ephemeris information, and/or the common TA broadcasted by the network. For the transparent forwarding NTN network architecture, the UE estimates the TA_service link corresponding to the service link based on the positioning capability and ephemeris information. For example, if the network broadcasts the common TA for a NTN cell, the UE determines the compensated TA as TA=TA_service link+common TA; if the network does not broadcast the common TA, the UE determines the compensated TA as TA=TA_service link. For the regenerative forwarding NTN network architecture, the UE estimates TA_service link corresponding to the service link based on the positioning capability and ephemeris information, then the UE determines the compensated TA as TA=TA_service link.

Method 2: UE first performs TA validity verification.

If the verification result is that TA is valid, UE uses the currently maintained TA value. If the verification result is that TA is invalid, the UE determines its own TA based on method 1.

For a UE that does not have the capability to perform TA pre-compensation based on the positioning capability, the UE first performs TA validity verification. If the verification result is that TA is valid, the UE can use PUR to transmit data.

In step 2, assuming that the last subframe used by UE to transmit PUSCH using PUR is subframe n, UE starts the PUR response window timer in subframe n+offset, and monitors a PDCCH scrambled by the PUR-RNTI during running of the PUR response window timer. The value of the offset is:

offset=max(4,RTT); or, offset=RTT, where RTT is the RTT between the UE and a base station.

For the transparent forwarding NTN network architecture, the RTT is the RTT between the UE and the ground base station. The determination method is: if the network broadcasts a common offset, then RTT=TA+common offset, where the common offset is a TA compensated by the network (that is, the advance offset of UL timing on the network side relative to UL timing); if the network does not broadcast common offset, then RTT=TA.

For the regenerative forwarding NTN network architecture, RTT is the RTT between UE and a satellite, that is, RTT=TA.

In step 3, during the running of the PUR response window timer, if the UE receives the PDCCH scrambled by the PUR-RNTI and the PDCCH indicates an uplink grant for uplink retransmission, then the UE performs uplink retransmission on the uplink grant resource. Assuming that the last subframe used for the retransmitted PUSCH transmission is subframe n, the PUR response window timer is restarted in subframe n+offset, where the determination method of the offset is the same as step 3.

Figure 6:
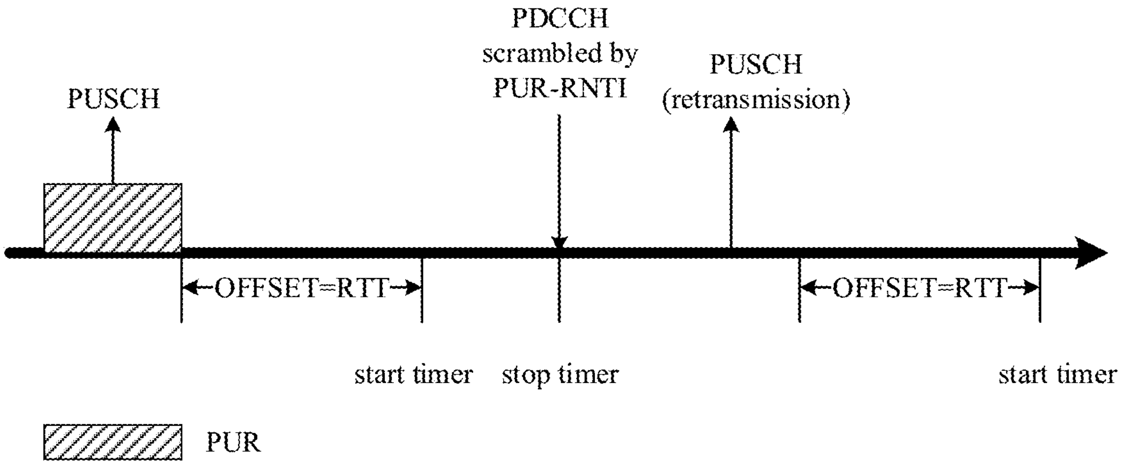
FIG. 6 is a sequence diagram of UE behavior provided by an embodiment of the present disclosure.

FIG. 6 shows a sequence diagram of UE behavior provided by an embodiment of the present disclosure. In the above example solution, for the sequence of UE's uplink transmission, timer start, and response monitoring, reference may be made to FIG. 6.

In an example solution based on the embodiment shown in FIG. 5 above, after the UE completes the PUR transmission, the duration of the PUR response window timer may be determined (or adjusted) according to the signal transmission round-trip delay between the UE and the network.

The procedure for a NB-IoT or eMTC terminal in the IDLE state to use PUR to transmit small data may be as follows:

In step 1, a NB-IoT or eMTC UE receives an RRC release message from the network, indicating to release the UE to the RRC IDLE state. The RRC release message includes PUR-Config. UE in the RRC IDLE state uses the PUR to send uplink data.

In step 2, assuming that the last subframe used by UE to perform PUSCH transmission using PUR is subframe n, the UE starts the PUR response window timer in subframe n+4, and monitors a PDCCH scrambled by the PUR-RNTI during running of the PUR response window timer. The duration of the PUR response window timer is PUR-ResponseWindowSize+offset, where the offset here is the above duration offset, and the value of the offset is:

offset=max(4,RTT)-4; or, offset=RTT-4.

The above PUR-ResponseWindowSize+offset is the initial timer duration set by the network.

In step 3, during the running of the PUR response window timer, if the UE receives the PDCCH scrambled by the PUR-RNTI and the PDCCH indicates an uplink grant for uplink retransmission, then the UE performs retransmission on the uplink grant resource. Assuming that the last subframe used for the retransmitted PUSCH transmission is subframe n, the PUR response window timer is restarted in subframe n+4.

Figure 7:
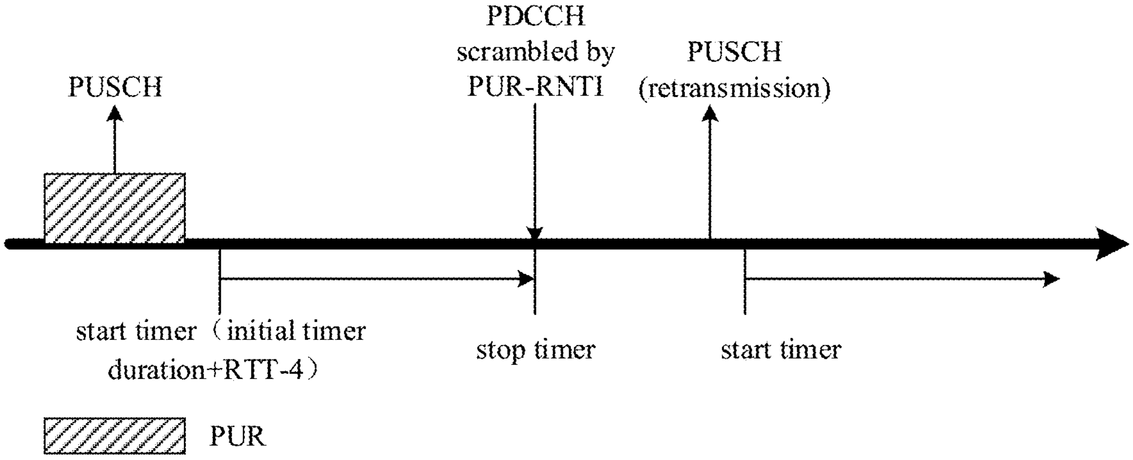
FIG. 7 is a sequence diagram of UE behavior provided by an embodiment of the present disclosure.

FIG. 7 shows a sequence diagram of UE behavior provided by an embodiment of the present disclosure. In the above example solution, for the sequence of UE's uplink transmission, timer start, and response monitoring, reference may be made to FIG. 7.

In an example solution based on the embodiment shown in FIG. 5 above, the procedure for an NR terminal in the INACTIVE state to use a CG resource to transmit small data may be as follows:

For a UE having both the positioning capability and the TA pre-compensation capability, the UE sends small data on the CG based on a valid TA maintained by the UE itself or based on a TA which is determined based on the GNSS positioning capability and ephemeris information, and/or the common TA broadcasted by the network. After the UE completes the CG transmission, the UE determines the start time moment of a first response window timer according to the signal transmission round-trip delay between the UE and the network.

The implementation procedure is as follows:

In step 1, the NR UE receives an RRC release message from the network, indicating to release the UE to the RRC INACTIVE state. The RRC release message contains a CG configuration. The CG configuration is used for the UE to transmit small data in the RRC INACTIVE state. The UE in the RRC INACTIVE state uses the CG to send uplink data.

For a UE having both the positioning capability and the TA pre-compensation capability, the UE first determines its own TA before using the CG to send uplink transmission, and uses the TA to send the PUSCH on the CG. The method for UE to determine TA is as follows:

Method 1: UE does not need to verify the validity of TA. The UE determines its own TA based on the GNSS positioning capability and ephemeris information, and/or the common TA broadcasted by the network.

For the transparent forwarding NTN network architecture, the UE estimates the TA_service link corresponding to the service link based on the positioning capability and ephemeris information: if the network broadcasts the common TA for a NTN cell, the UE determines the compensated TA as TA=TA_service link+common TA; if the network does not broadcast common TA, UE determines the compensated TA as TA=TA_service link.

For the regenerative forwarding NTN network architecture, the UE estimates TA_service link corresponding to the service link based on the positioning capability and ephemeris information, and the UE determines the compensated TA as TA=TA_service link.

Method 2: UE first performs TA validity verification. If the verification result is that TA is valid, UE uses the currently maintained TA value. If the verification result is that TA is invalid, UE determines its own TA based on method 1.

For a UE that does not have the capability to perform TA pre-compensation based on the positioning capability, the UE first performs TA validity verification, and if the verification result is that TA is valid, the UE can use the CG to transmit data.

In step 2, UE starts the first response window timer after a time offset after completing the first repetition of PUSCH or the last repetition of PUSCH using CG, and monitors a PDCCH scrambled by a first RNTI during running of the first response window timer. The duration of the first response window timer is configured by the network, and the first RNTI is a UE-specific RNTI. The value of the offset is offset=RTT; or offset is the maximum value between RTT and a specific time interval. The specific time interval may be a time interval from the moment when the first repetition or the last repetition of the PUSCH is completed to a next PDCCH monitoring occasion; wherein the RTT is the RTT between the UE and the base station.

For the transparent forwarding NTN network architecture, the RTT is the RTT between the UE and the ground base station. The determination method is: if the network broadcasts a common offset, then RTT=TA+common offset, where the common offset is TA compensated by the network (that is, the advance offset of UL timing on the network side relative to UL timing); if the network does not broadcast common offset, then RTT=TA.

For the regenerative forwarding NTN network architecture, the RTT is the RTT between UE and a satellite, that is, RTT=TA.

In step 3, during the running of the first response window timer, if the UE receives the PDCCH scrambled by the first RNTI and the PDCCH indicates an uplink grant for uplink retransmission, then the UE stops the first response window timer when the PDCCH is received. The UE performs retransmission on the uplink grant resource, and restarts the first response window timer after a time offset after completing the PUSCH transmission.

Figure 8:
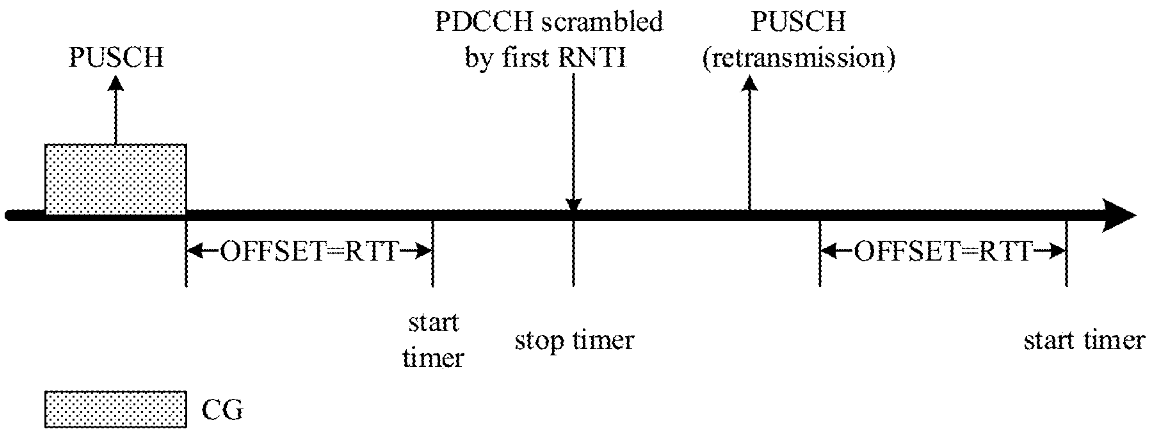
FIG. 8 is a sequence diagram of UE behavior provided by an embodiment of the present disclosure.

FIG. 8 shows a sequence diagram of UE behavior provided by an embodiment of the present disclosure. In the above example solution, for the sequence of UE's uplink transmission, timer start, and response monitoring, reference may be made to FIG. 8.

In an example solution based on the embodiment shown in FIG. 5 above, after the UE completes the CG transmission, the UE determines the duration of the first response window timer according to the signal transmission round-trip delay between the UE and the network.

The implementation procedure is as follows:

In step 1, a NR UE receives an RRC release message from the network, indicating to release the UE to the RRC INACTIVE state. The RRC release message contains a CG configuration. The CG configuration is used for the UE to transmit small data in the RRC INACTIVE state. The UE in the RRC INACTIVE state uses the CG to send uplink data.

In step 2, the UE starts the first response window timer in the first time unit (such as time symbol) or the first PDCCH monitoring occasion after the first repetition or the last repetition of PUSCH is completed using CG, and monitors a PDCCH scrambled by a first RNTI during the running of the first response window timer. The duration of the first response window timer is a first duration+offset. The first duration is configured by the network, and the value of offset is a difference between RTT and a specific time interval; or the offset is a difference between the specific timer interval and the maximum value between RTT and the specific time interval (in other words, offset is: the maximum value of 0 and the difference between RTT and the specific time interval). The specific time interval may be a time interval between the time moment when the first repetition or the last repetition of the PUSCH is completed and a next PDCCH monitoring occasion. The RTT is the RTT between the UE and the base station. The first RNTI is a UE-specific RNTI.

In step 3, during the running of the first response window timer, if the UE receives the PDCCH scrambled by the first RNTI and the PDCCH indicates an uplink grant for uplink retransmission, then the UE stops the first response window timer when the PDCCH is received. The UE performs retransmission on the uplink grant resource, and starts the first response window timer in the first time unit (such as time symbol) or the first PDCCH monitoring occasion after the first repetition or the last repetition of the PUSCH is completed, and monitors the PDCCH scrambled by the first RNTI during the running of the first response window timer.

Figure 9:
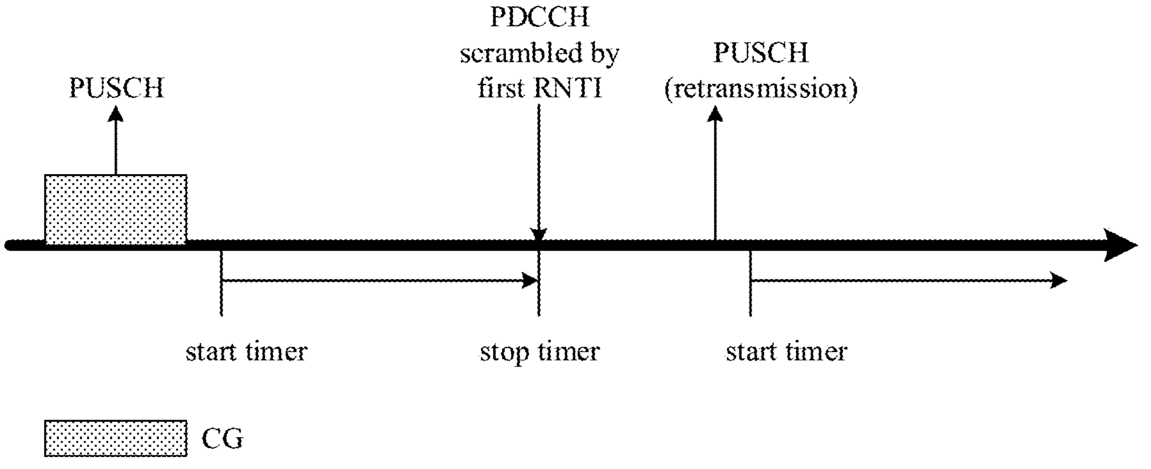
FIG. 9 is a sequence diagram of UE behavior provided by an embodiment of the present disclosure.

FIG. 9 shows a sequence diagram of UE behavior provided by an embodiment of the present disclosure. In the above example solution, for sequence of UE's uplink transmission, timer start, and response monitoring, reference may be made to FIG. 9.

The following are device embodiments of the present disclosure, which can be used to implement the method embodiments of the present disclosure. For details not disclosed in the device embodiments of the present disclosure, reference may be made to the method embodiments of the present disclosure.

Figure 10:
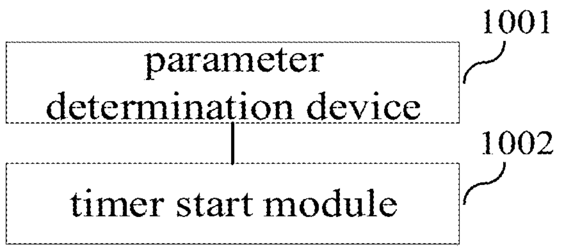
FIG. 10 is a block diagram of a timer starting device provided by an embodiment of the present disclosure.

FIG. 10 shows a block diagram of a timer start device provided by an embodiment of the present disclosure. The device is applied in a terminal, and has the functions of implementing the steps performed by the terminal in the above timer start methods. As shown in FIG. 10, the device may include a parameter determination device 1001 and a timer start module 1002.

The parameter determination device 1001 is configured to determine a control parameter of a response time window timer based on a Round Trip Time (RTT) between the terminal and a network side device, wherein the control parameter includes at least one of a start time offset of the timer and a timer duration. The start time offset of the timer is a time interval between an end time moment of uplink transmission corresponding to uplink small data and a start time moment of the response time window timer for the uplink transmission.

The timer start module 1002 is configured to, after the terminal performs the uplink transmission, start the response time window timer corresponding to the uplink transmission based on the control parameter.

In a possible implementation, when the uplink transmission is a transmission performed based on a Preconfigured Uplink Resource (PUR), or an uplink retransmission based on an indication of a Physical Downlink Control Channel (PDCCH) scrambled by a PUR Radio Network Temporary Identity (PUR-RNTI):

the start time offset is a maximum value of the RTT and a first time offset;

or, the start time offset is the RTT.

In a possible implementation, a value of the first time offset is a predefined value.

In a possible implementation, the first time offset is four subframes.

In a possible implementation, when the uplink transmission is a transmission performed based on a Configured Grant (CG) resource, or an uplink retransmission based on an indication of a PDCCH scrambled by a first RNTI:

the start time offset is a maximum value of the RTT and a second time offset;

or, the start time offset is the RTT;

wherein the first RNTI is used to indicate retransmission scheduling for CG transmission in an RRC_INACTIVE state.

In a possible implementation, a value of the second time offset is a predefined value.

In a possible implementation, the value of the second time offset is a time interval from a completion of the first repetition of the uplink transmission performed by the terminal to a next PDCCH monitoring occasion;

or, the value of the second time offset is a time interval from a completion of the last repetition of the uplink transmission performed by the terminal to a next PDCCH monitoring occasion.

In a possible implementation, the timer duration is determined based on a duration offset and an initial timer duration, and the initial timer duration is configured by a network.

In a possible implementation, the timer duration is a sum of the duration offset and the initial timer duration.

In a possible implementation, when the uplink transmission is a transmission performed based on PUR, or an uplink retransmission based on an indication of a PDCCH scrambled by a PUR-RNTI:

the duration offset is a difference between a third time offset and a maximum value of the RTT and the third time offset;

or, the duration offset is a difference between the RTT and the third time offset.

In a possible implementation, a value of the third time offset is a predefined value.

In a possible implementation, the third time offset is four subframes.

In a possible implementation, when the uplink transmission is a transmission performed based on a CG resource, or is an uplink retransmission based on an indication of a PDCCH scrambled by a first RNTI:

the duration offset is a difference between a fourth time offset and a maximum value of the RTT and the fourth time offset;

or, the duration offset is a difference between the RTT and the fourth time offset.

In a possible implementation, a value of the fourth time offset is a predefined value.

In a possible implementation, the value of the fourth time offset is a time interval from a completion of the first repetition of the uplink transmission performed by the terminal to a next PDCCH monitoring occasion;

or, the value of the fourth time offset is a time interval from a completion of the last repetition of the uplink transmission performed by the terminal to a next PDCCCH monitoring occasion.

In a possible implementation, a Hybrid Automatic Repeat reQuest (HARQ) process used for the uplink transmission is a HARQ process for which an uplink HARQ retransmission function is enabled.

In a possible implementation, when a network where the terminal resides in is a Non Terrestrial Network (NTN) based on a transparent forwarding architecture, the RTT is a round-trip propagation delay of a wireless signal between the terminal and a ground base station in the NTN.

In a possible implementation, when the terminal receives a first common offset indicated by a system, the RTT is a sum of the first common offset and an uplink Timing Advance (TA) of the terminal;

when the terminal does not receive the first common offset indicated by the system, the RTT is the TA of the terminal.

In a possible implementation, when a network where the terminal resides in is a NTN based on a regenerative forwarding architecture, the RTT is a round-trip propagation delay of a wireless signal between the terminal and a satellite in the NTN.

In a possible implementation, the RTT is a TA of the terminal.

In a possible implementation, the device further includes:

a first uplink advance obtaining module configured to, before the terminal performs the uplink transmission, when the terminal has a positioning capability and a TA pre-compensation capability, obtain a service link TA of the terminal based on the positioning capability and ephemeris information; and a second uplink advance obtaining module configured to obtain a TA of the terminal based on the service link TA.

In a possible implementation, the second uplink advance obtaining module is configured to:

when a network where the terminal resides in is a NTN based on a transparent forwarding architecture and the terminal receives a common TA indicated by a system, determine a sum of the service link TA and the common TA as the TA of the terminal;

when the network where the terminal resides in is the NTN based on the transparent forwarding architecture and the terminal does not receive the common TA indicated by the system, determine the service link TA as the TA of the terminal.

In a possible implementation, the second uplink advance obtaining module is configured to:

when a network where the terminal resides in is a NTN based on a regenerative forwarding architecture, determine the service link TA as the TA of the terminal.

In a possible implementation, the first uplink advance obtaining module is configured to:

before the terminal performs the uplink transmission, when the terminal has the positioning capability and the TA pre-compensation capability, obtain the service link TA of the terminal based on the positioning capability and ephemeris information without verifying validity of a TA maintained by the terminal.

In a possible implementation, the device further includes:

a verification module configured to, before the terminal performs the uplink transmission, verify validity of a TA maintained by the terminal; and a first uplink advance obtaining module configured to, when the TA maintained by the terminal fails validity verification and the terminal has the positioning capability and the TA pre-compensation capability, obtain the service link TA of the terminal based on the positioning capability and ephemeris information.

In a possible implementation, the device further includes:

a third uplink advance obtaining module configured to, when the TA maintained by the terminal passes the validity verification, determine the TA maintained by the terminal as the TA of the terminal.

In a possible implementation, the terminal is a terminal in a Radio Resource Control (RRC) inactive state.

In view of the above, in the solutions shown in the embodiments of the present disclosure, for the response time window timer corresponding to the uplink transmission corresponding to the uplink small data, the terminal can determine the start time offset of the timer and/or timer duration more accurately based on the RTT between the terminal and the network side device, so as to more accurately control the time for monitoring a response from the network side, thereby realizing accurate reception of the response and improving the transmission effect of the uplink small data. In addition, the solutions can avoid unnecessary monitoring of a downlink control signal by the terminal and achieve the effect of power saving by the terminal.

Figure 11:
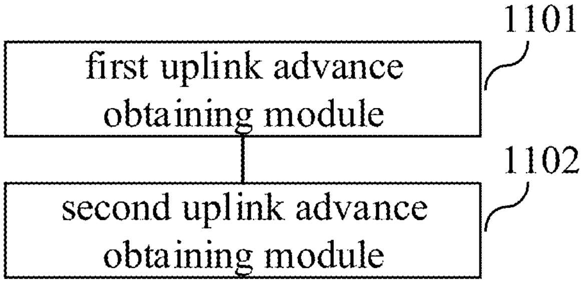
FIG. 11 is a block diagram of an uplink advance obtaining device provided by an embodiment of the present disclosure.

FIG. 11 is a block diagram of an uplink advance obtaining device provided by an embodiment of the present disclosure. The device is applied in a terminal, and has the functions of implementing steps in the methods for timer start/uplink advance obtaining performed by the terminal. As shown in FIG. 11, the device may include a first uplink advance obtaining module 1101 and a second uplink advance obtaining module 1102.

The first uplink advance obtaining module 1101 is configured to, before the terminal performs an uplink transmission corresponding to uplink small data, when the terminal has a positioning capability and a Timing Advance (TA) pre-compensation capability, obtain a service link TA of the terminal based on the positioning capability and ephemeris information.

The second uplink advance obtaining module 1102 is configured to obtain a TA of the terminal based on the service link TA.

In view of the above, in the solutions shown in the embodiments of the present disclosure, when a service link exists between a terminal and a network side device, the terminal can, based on the positioning capability and ephemeris information, obtain the service link TA that needs to be compensated due to the influence of the distance of the service link in the NTN, and then obtain the TA of the terminal based on the service link TA. Thus, the solutions can achieve an accurate prediction of the TA required for uplink transmission by the terminal. This reduces as much as possible the influence of the communication distance between the terminal and the satellite on the uplink transmission corresponding to the small uplink data in the NTN network, and improves the accuracy of the uplink transmission in the NTN network. In addition, the solutions can avoid unnecessary monitoring of a downlink control signal by the terminal, thereby achieving the effect of power saving of the terminal.

It should be noted that when the devices provided by the above embodiments realizes their functions, the division of the above-mentioned functional modules is used as an example for illustration. In practical applications, the above-mentioned functions can be completed by different functional modules according to actual needs. That is, the content structure of the devices may be divided into different functional modules to complete all or part of the functions described above.

Regarding the devices in the foregoing embodiments, the specific manner in which each module executes operations has been described in detail in the embodiments related to the methods, and will not be described in detail here.

Figure 12:
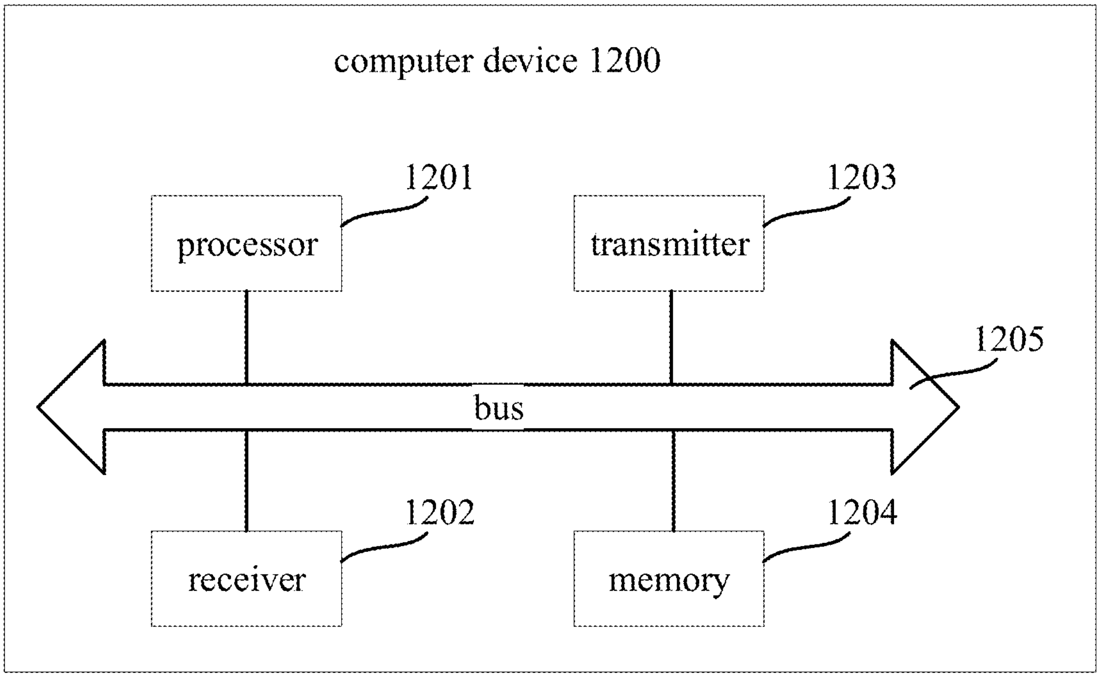
FIG. 12 is a schematic structural diagram of a computer device provided by an embodiment of the present disclosure.

FIG. 12 shows a schematic structural diagram of a computer device 1200 provided by an embodiment of the present application. The computer device 1200 may include: a processor 1201, a receiver 1202, a transmitter 1203, a memory 1204 and a bus 1205.

The processor 1201 includes one or more processing cores, and the processor 1201 executes various functional applications and information processing by running software programs and modules.

The receiver 1202 and the transmitter 1203 may be realized as a communication component, and the communication component may be a communication chip. The communication chip may also be called a transceiver.

The memory 1204 is connected to the processor 1201 through the bus 1205. The memory 1204 may be used to store a computer program, and the processor 1201 is used to execute the computer program, so as to implement various steps performed by the terminal device in the foregoing method embodiments.

In addition, the memory 1204 can be realized by any type of volatile or non-volatile storage device or their combination. The volatile or non-volatile storage device includes but not limited to: magnetic disk or optical disk, electrically erasable programmable read only memory, erasable programmable read only memory, static random access memory, read only memory, magnetic memory, flash memory, or programmable read only memory.

In an example embodiment, the computer device includes a processor, a memory, and a transceiver (the transceiver may include a receiver and a transmitter, the receiver is used to receive information, and the transmitter is used to send information).

In a possible implementation, when the computer device is implemented as a terminal:

the processor is configured to determine a control parameter of a response time window timer based on a Round Trip Time (RTT) between the terminal and a network side device, wherein the control parameter includes at least one of a start time offset of the timer and a timer duration; wherein the start time offset of the timer is a time interval between an end time moment of uplink transmission corresponding to uplink small data and a start time moment of the response time window timer for the uplink transmission; and the processor is further configured to, after the terminal performs the uplink transmission, start the response time window timer corresponding to the uplink transmission based on the control parameter.

In another possible implementation, when the computer device is implemented as a terminal:

the processor is configured to, before the terminal performs an uplink transmission corresponding to uplink small data, when the terminal has a positioning capability and a Timing Advance (TA) pre-compensation capability, obtain a service link TA of the terminal based on the positioning capability and ephemeris information;

the processor is further configured to obtain the TA of the terminal based on the service link TA.

For each method step performed by the terminal in the embodiments of the present disclosure, reference may be made to all or part of the steps performed by the terminal in the embodiments shown in FIG. 3, FIG. 4 or FIG. 5, and details are not repeated here.

An embodiment of the present disclosure also provides a computer-readable storage medium. The storage medium has a computer program stored therein. The computer program is loaded and executed by a processor to implement the various steps performed by the terminal in the methods shown in FIG. 3, FIG. 4 or FIG. 5 above.

An embodiment of the present disclosure also provides a computer program product or computer program. The computer program product or computer program includes computer instructions stored in a computer-readable storage medium. A processor of a computer device reads the computer instructions from the computer-readable storage medium, and the processor executes the computer instructions, to cause the computer device to perform the various steps performed by the terminal in the methods shown in FIG. 3, FIG. 4 or FIG. 5 above.

Those skilled in the art should be aware that, in the foregoing one or more examples, the functions described in the embodiments of the present disclosure may be implemented by hardware, software, firmware or any combination thereof. When implemented in software, the functions may be stored on or transmitted as one or more instructions or codes on a computer-readable medium. The computer-readable medium includes both a computer storage medium and a communication medium. The communication medium includes any medium that facilitates transfer of a computer program from one place to another. A storage medium may be any available medium that can be accessed by a general purpose or special purpose computer.

The above are only example embodiments of the present disclosure, and are not intended to limit the present disclosure. Any modifications, equivalent replacements, improvements, etc. made within the spirit and principles of the present disclosure should fall within the protection scope of the present disclosure.

What is claimed is:

1. A timer starting method, the method being performed by a terminal, and the method comprising:

determining a control parameter of a response time window timer based on a Round Trip Time (RTT) between the terminal and a network side device, wherein the control parameter comprises at least one of a start time offset of the timer and a timer duration;

wherein the start time offset of the timer is a time interval between an end time moment of an uplink transmission corresponding to uplink small data and a start time moment of the response time window timer for the uplink transmission; and after the terminal performs the uplink transmission, starting the response time window timer corresponding to the uplink transmission based on the control parameter;

wherein in response to the uplink transmission being a transmission performed based on a Preconfigured Uplink Resource (PUR), when the terminal receives a first common offset indicated by a system, the RTT is a sum of the first common offset and an uplink Timing Advance (TA) of the terminal, and when the terminal does not receive the first common offset indicated by the system, the RTT is the TA of the terminal;

wherein the method further comprises:

before the terminal performs the uplink transmission, when the terminal has a positioning capability and a TA pre-compensation capability, obtaining a service link TA of the terminal based on the positioning capability and ephemeris information; and obtaining the TA of the terminal based on the service link TA.

2. The method according to claim 1, wherein:

the start time offset is a maximum value of the RTT and a first time offset;

or, the start time offset is the RTT.

3. The method according to claim 2, wherein a value of the first time offset is a predefined value, and wherein the first time offset is four subframes.

4. The method according to claim 1, wherein in response to the uplink transmission being a transmission performed based on a Configured Grant (CG) resource, or an uplink retransmission based on an indication of a Physical Downlink Control Channel (PDCCH) scrambled by a first Radio Network Temporary Identity (RNTI):

the start time offset is a maximum value of the RTT and a second time offset;

or, the start time offset is the RTT;

wherein the first RNTI is used to indicate retransmission scheduling for CG transmission in an RRC_INACTIVE state.

5. The method according to claim 4, wherein:

the value of the second time offset is a time interval from a completion of a first repetition of the uplink transmission performed by the terminal to a next PDCCH monitoring occasion;

or, the value of the second time offset is a time interval from a completion of a last repetition of the uplink transmission performed by the terminal to a next PDCCH monitoring occasion.

6. The method according to claim 1, wherein the timer duration is determined based on a duration offset and an initial timer duration, and the initial timer duration is configured by a network.

7. The method according to claim 6, wherein the timer duration is a sum of the duration offset and the initial timer duration.

8. The method according to claim 6, wherein:

the duration offset is a difference between a third time offset and a maximum value of the RTT and the third time offset;

or, the duration offset is a difference between the RTT and the third time offset.

9. The method according to claim 1, wherein obtaining the TA of the terminal based on the service link TA comprises:

when a network where the terminal resides in is a Non-Terrestrial Network (NTN) based on a transparent forwarding architecture and the terminal receives a common TA indicated by a system, determining a sum of the service link TA and the common TA as the TA of the terminal;

when the network where the terminal resides in is the NTN based on the transparent forwarding architecture and the terminal does not receive the common TA indicated by the system, determining the service link TA as the TA of the terminal.

10. The method according to claim 1, wherein obtaining the TA of the terminal based on the service link TA comprises:

when a network where the terminal resides in is a NTN based on a regenerative forwarding architecture, determining the service link TA as the TA of the terminal.

11. The method according to claim 1, wherein before the terminal performs the uplink transmission, when the terminal has the positioning capability and the TA pre-compensation capability, obtaining the service link TA of the terminal based on the positioning capability and ephemeris information, comprises:

before the terminal performs the uplink transmission, when the terminal has the positioning capability and the TA pre-compensation capability, obtaining the service link TA of the terminal based on the positioning capability and ephemeris information without verifying validity of a TA maintained by the terminal.

12. The method according to claim 1, wherein before the terminal performs the uplink transmission, when the terminal has the positioning capability and the TA pre-compensation capability, prior to obtaining the service link TA of the terminal based on the positioning capability and ephemeris information, the method further comprises:

before the terminal performs the uplink transmission, verifying validity of a TA maintained by the terminal;

wherein when the terminal has the positioning capability and the TA pre-compensation capability, obtaining the service link TA of the terminal based on the positioning capability and the ephemeris information comprises:

when the TA maintained by the terminal fails validity verification and the terminal has the positioning capability and the TA pre-compensation capability, obtaining the service link TA of the terminal based on the positioning capability and ephemeris information.

13. The method according to claim 12, further comprising:

when the TA maintained by the terminal passes the validity verification, determining the TA maintained by the terminal as the TA of the terminal.

14. A terminal, comprising:

a processor; and a memory storing instructions executable by the processor;

wherein when the instructions are executed by the processor, the terminal is caused to:

determine a control parameter of a response time window timer based on a Round Trip Time (RTT) between the terminal and a network side device, wherein the control parameter comprises at least one of a start time offset of the timer and a timer duration;

wherein the start time offset of the timer is a time interval between an end time moment of an uplink transmission corresponding to uplink small data and a start time moment of the response time window timer for the uplink transmission; and after the terminal performs the uplink transmission, start the response time window timer corresponding to the uplink transmission based on the control parameter;

wherein:

in response to the uplink transmission being a transmission performed based on a Preconfigured Uplink Resource (PUR), when the terminal receives a first common offset indicated by a system, the RTT is a sum of the first common offset and an uplink Timing Advance (TA) of the terminal, and when the terminal does not receive the first common offset indicated by the system, the RTT is the TA of the terminal;

wherein when the instructions are executed by the processor, the terminal is further caused to:

before the terminal performs the uplink transmission, when the terminal has a positioning capability and a TA pre-compensation capability, obtain a service link TA of the terminal based on the positioning capability and ephemeris information; and obtain the TA of the terminal based on the service link TA.

15. The terminal according to claim 14, wherein:

the start time offset is a maximum value of the RTT and a first time offset;

or, the start time offset is the RTT.

16. The terminal according to claim 15, wherein when a network where the terminal resides in is a Non-Terrestrial Network (NTN) based on a regenerative forwarding architecture, the RTT is a round-trip propagation delay of a wireless signal between the terminal and a satellite in the NTN;

wherein the RTT is a TA of the terminal.

17. The terminal according to claim 15, wherein the terminal is a terminal in a Radio Resource Control (RRC) inactive state.

* * * * *